G. H. GERE.
BEARING FOR INTERNAL COMBUSTION ENGINES.
APPLICATION FILED MAY 17, 1913.

1,176,749.

Patented Mar. 28, 1916.

WITNESSES:
M. A. Johnson
L. M. Funke

INVENTOR
George H. Gere,
BY
Wm. H. Canfield.
ATTORNEY.

THE COLUMBIA PLANOGRAPH CO., WASHINGTON, D. C.

UNITED STATES PATENT OFFICE.

GEORGE H. GERE, OF NEWARK, NEW JERSEY.

BEARING FOR INTERNAL-COMBUSTION ENGINES.

1,176,749.  Specification of Letters Patent.  Patented Mar. 28, 1916.

Application filed May 17, 1913. Serial No. 768,224.

*To all whom it may concern:*

Be it known that I, GEORGE H. GERE, a citizen of the United States, residing at Newark, in the county of Essex and State of New Jersey, have invented certain new and useful Improvements in Bearings for Internal-Combustion Engines; and I do hereby declare the following to be a full, clear, and exact description of the invention, such as will enable others skilled in the art to which it appertains to make and use the same, reference being had to the accompanying drawing, and to figures of reference marked thereon, which form a part of this specification.

This invention relates to an improved crank case for engines, and is designed to provide a construction in which the leakage is reduced to a minimum. In the old type of bearing the crank case was made of two members which fitted together, each of the crank case members having a recess of semi-cylindrical or similar form, and the shaft ran in a bearing in the recess, the packing around the shaft and between the members being usually sufficient, but at the point where the members came together adjacent to the shaft, was a point where leaking was apt to take place and where leaks usually first developed. The rotating shaft abutting against the two edges of the packing between the members quickly wore away the packing at these abutting edges. To prevent this I have devised this improved casing for an internal combustion engine in which the rotating shaft does not come in contact with the packing that is placed between the casing members.

The invention is illustrated in the accompanying drawing, in which—

Figure 1:
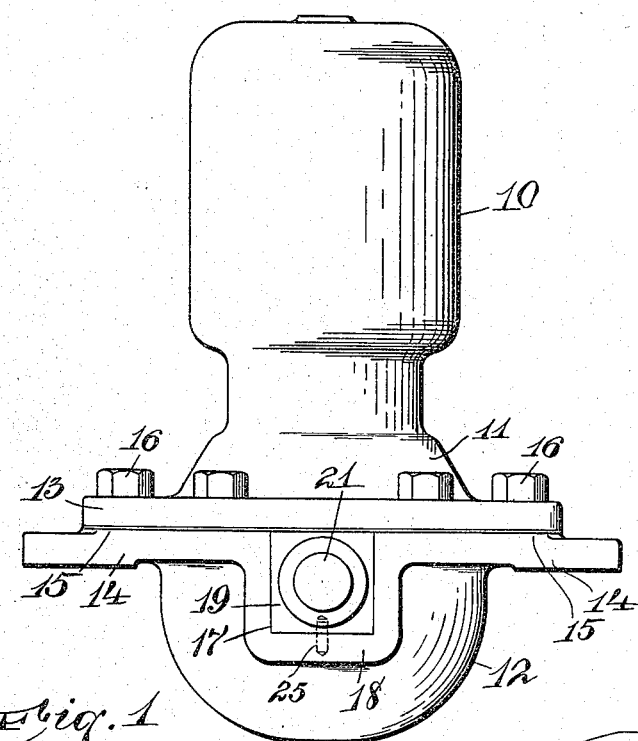
Figure 2:
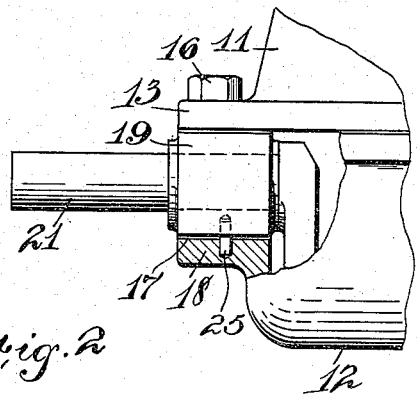
Figure 3:
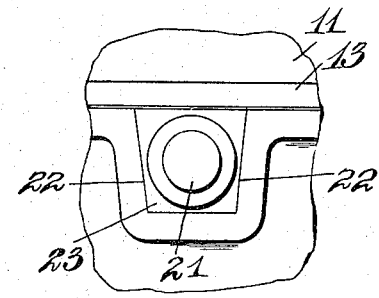

Figure 1 is an end view of an internal combustion engine showing the improved type of casing which goes to make up the crank case. Fig. 2 is a side view of one end of the casing shown in Fig. 1, but broken away to show the construction. Fig. 3 is a face view of a bearing of a modified form.

I have illustrated one type of internal combustion engine, but it will be apparent that this device can be used on any form, and is adapted to provide a joint which prevents the leaking of oil, or in case of an engine which uses the crank case for compression to provide an air-tight structure in which the compression can be brought about. The engine 10 is provided with a crank case which consists of the member 11, known as the upper member, and the lower member 12. Both members are provided with flanges 13 and 14 respectively which abut the major portion of their length and are adapted to receive a packing 15 between them to make a tight joint when the bolts 16 are screwed up. At least one of the members, and in the drawing I show the lower member, is provided with a recess 17, which recess is preferably flanked by the part 18 which is a continuation of the flange 14. A bearing block 19 fits into the recess and is usually made to tightly fit, and this tight fitting of the bearing block into the recess has been found to be tight enough to prevent any leakage. The bearing block 19 is perforated to permit the passage of a shaft 21 therein, the shaft 21 being fixed in the bearing block as desired, being preferably mounted therein in a bushing of Babbitt metal or the like.

In Fig. 3 I illustrate a modified form in which the sides 22 of the recess are inclined and the block 23 is similarly inclined at its side edges so that when the members are brought together, the converging sides of the recess and the bearing block are tightly fitted together, being usually milled so as to be wedged together in a sense so that there is no leaking. A number of different means can be employed for fastening the bearing block in its recess against movement longitudinally on the shaft, but I illustrate but one method for doing this which consists of the pin 25 which is placed so that it rests in the recesses both in one of the members of the casing and in the bearing block.

Having thus described my invention, what I claim is:—

1. The combination of an inclosing casing formed of two members, at least one of the members being recessed adjacent to the other member, with a bearing block fitting in the recess and held in place by the other member, the block being perforated within its edges so as to receive and surround a shaft.

2. The combination of an inclosing casing formed of two members, at least one of the members being recessed adjacent to the other member where a shaft is arranged to emerge, the recess having straight sides, with a bearing block fitting the recess with one edge in position to be engaged by the other member, the block having a perforation to receive the shaft.

3. The combination of a casing formed of two members fitting together, at least one of the members being recessed where the members abut, the recess having straight sides, with a bearing block fitting the recess and having its outer edge flush with the member, the block having a perforation therein to receive a shaft.

In testimony that I claim the foregoing I have hereunto set my hand this 5th day of May, 1913.

GEORGE H. GERE.

Witnesses:
WM. H. CAMFIELD,
M. A. JOHNSON.